May 18, 1943.  P. ORR  2,319,746
TRANSMISSION
Filed Sept. 26, 1940  2 Sheets-Sheet 1

Inventor:
Palmer Orr
By: Edward C. Gritzbaugh
Atty.

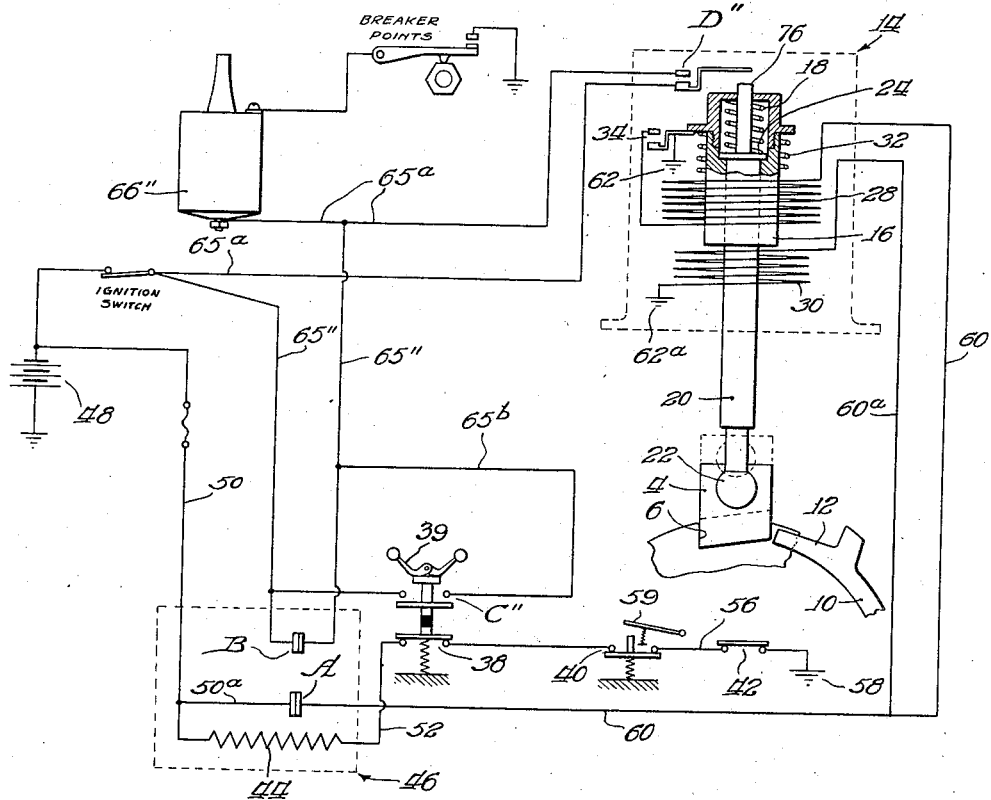

Patented May 18, 1943

2,319,746

UNITED STATES PATENT OFFICE 2,319,746

TRANSMISSION

Palmer Orr, Muncie, Ind., assignor to Borg-Warner Corporation, Chicago, Ill., a corporation of Illinois Application September 26, 1940, Serial No. 358,457

25 Claims. (Cl. 192—3)

This invention relates to multiple drive ratio transmissions of the type wherein a drive may be established through a planetary gear train by breaking the sun gear of the planetary gearing under the control of electro-magnetic means such as a solenoid, and wherein such solenoid may be rendered inoperative so as to release the sun gear and cut out the planetary gearing, thereby establishing a drive of a different ratio. In general, the purpose of the invention is to simplify the electrical mechanism of such a transmission without in any way eliminating or impairing any of its functions.

There are in use at present, transmissions of this type in the form of overdrive transmissions wherein the braking of the sun gear is accomplished by a bolt which is adapted to be projected into engagement with a cooperating member attached to the sun gear. The means for withdrawing the bolt, which preferably comprises a spring, is not sufficiently powerful to move the bolt away from the inter-engaging member while driving torque is being imposed upon the sun gear. Accordingly, it is considered necessary to provide mechanism for momentarily relieving the driving torque so as to release the bolt and allow it to be retracted. Such means is in the form of electrical mechanism for momentarily interrupting the ignition circuit of the engine, simultaneously with de-energizing the solenoid by which the bolt is projected into braking position.

In such overdrive transmissions, the electrical control mechanism includes a speed responsive governor adapted, when the speed of drive through the transmission has reached a predetermined level at which the transmission may operate efficiently in overdrive, to establish the circuit which energizes the solenoid for projecting the bolt toward sun gear braking position. Return to direct drive may be effected either by dropping the governor speed below the overdrive zone or by moving the throttle control, such as the accelerator pedal, beyond its wide open throttle position and thereby opening a switch that is in series with the governor and consequently adapted to open the solenoid circuit. Such control mechanism also includes a duplex relay having a first set of contacts through the medium of which the solenoid circuit is established and a second set of contacts adapted to close when the first set opens and thereby to establish the ignition grounding circuit simultaneously with the deenergization of the solenoid. This circuit includes another switch, in series with the second set of contacts of the duplex relay, and adapted in response to retracting movement of the braking bolt to open so as to reestablish the ignition. The grounding circuit further includes a third switch embodied in a delayed action relay which is likewise adapted to open the grounding circuit so as to reestablish the ignition, and which is not dependent upon the movement of the braking bolt, and therefore, is effective to reestablish the ignition after a short interruption, even though the bolt should fail to be retracted. The latter condition may arise when the accelerator is depressed rapidly after a period of operation in overdrive with the throttle closed and the sun gear braking bolt engaged under a coast load. Under such conditions it is necessary to accelerate the engine so as to establish a forward driving torque against the sun gear in order to release the bolt, and if the depression of the accelerator pedal is too rapid, the engine may be "killed" without removing the coast load, and the bolt thereby prevented from retracting. Should this occur, the delayed action relay will reestablish the ignition, the engine will proceed to accelerate, the coast load will be removed, and the bolt will be withdrawn.

The present invention simplifies the foregoing contol mechanism by eliminating the third switch of the grounding circuit and utilizing the bolt operated switch as the sole means for opening the circuit. Uncertainty of operation of the latter is eliminated by introducing a delayed action in the duplex relay so that under no condition can the grounding circuit be established immediately on opening the throttle. In this respect, the invention aims to improve upon the prior arrangement by providing for uniform operation in all cases where throttle control is effected while the transmission is operating in the overdrive range.

The invention further provides an arrangement for insuring the completion of the accelerator controlled gear ratio change under all conditions including the situation where the throttle is opened rapidly after a period of operation under closed throttle with the vehicle coasting against the engine below the governor cut-out speed. Under such conditions, the grounding switch of the duplex relay will be closed as a result of the opening of the main control circuit, and the ignition will be grounded, making it impossible to secure the necessary torque reversal for releasing the coast load on the bolt when the throttle is moved to wide open position. The invention counteracts or prevents these conditions from arising by providing a second set of contacts either in the governor or the accelerator controlled switch, said contacts being in series with the grounding switch of the duplex relay and adapted to open the grounding circuit when the govenor drops below the cutout speed where they are embodied in the governor switch or to establish the grounding circuit where they are embodied in the accelerator controlled switch.

Other objects, the advantages and uses of the invention will become more apparent after reading the following specification and claims, and after consideration of the drawings forming a part of the specification wherein:

Fig. 3 is a schematic view of a control mechanism embodying another modified form of the invention.

Figure 1:
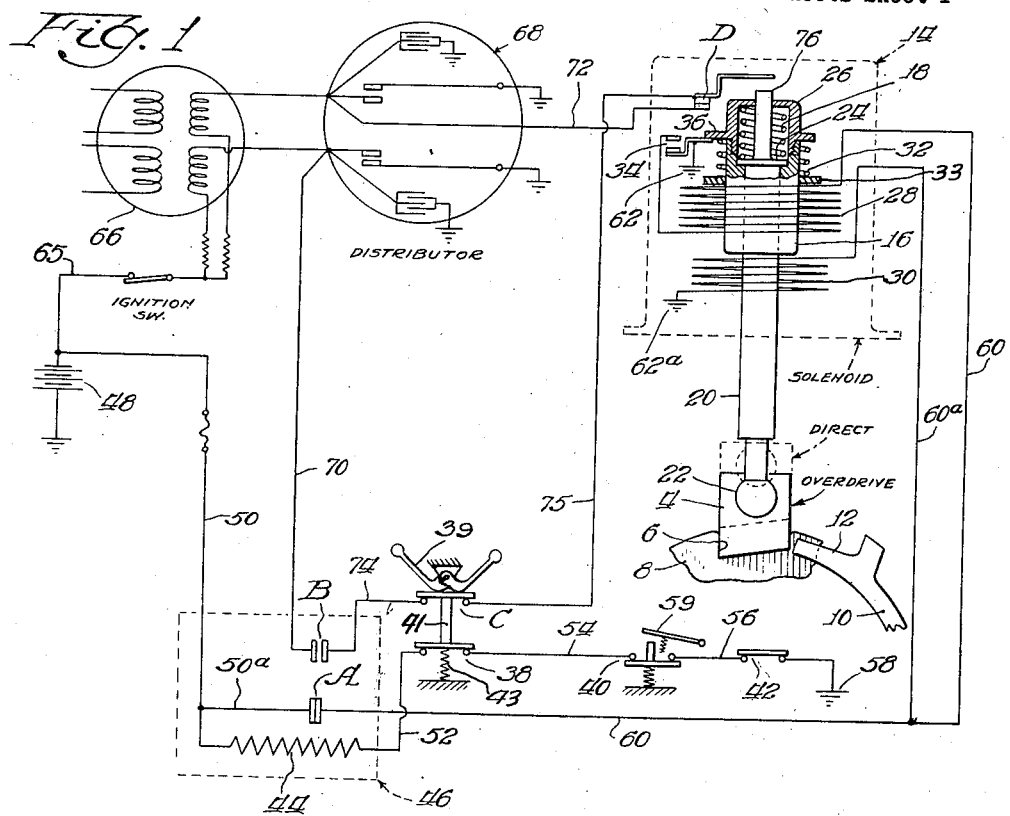
Fig. 1 is a schematic view of the control mechanism of an overdrive transmission embodying the invention.

As an example of one form in which the invention may be embodied, I have illustrated in Fig. 1 the control mechanism of an overdrive transmission which may be of any known construction and arrangement adapted to be shifted from one drive to another and vice versa solely by the braking and releasing of the sun gear of a planetary gear system incorporated therein.

For braking the sun gear, I provide a bolt or pawl 4 adapted to engage in a notch 6 of a ring 8 attached to the sun gear, when permitted to do so by a balk ring 10 having a frictional drive connection with the ring 8 or the sun gear and having a blocking portion 12 adapted to be interposed in the path of projection of the bolt 4 until a reversal of driving torque causes it to oscillate away from blocking position.

The bolt 4 is adapted to be biased toward braking position by a solenoid 14 having an armature 16 acting through a coil spring 18 against a rod 20 which is connected to the bolt 4 at 22. The armature 16 is in the form of a sleeve and the rod 20 is extended axially therethrough with the spring 18 compressed between a shoulder 24 on the rod and a cap 26 on the end of the armature 16.

The solenoid 14 includes two separate coils 28 and 30 for moving the armature in bolt projecting direction, against the resistance of the spring 18 and of the spring 32 which serves to retract the armature and bolt assembly when the solenoid is deenergized. The spring 32 reacts between a flange 36 on the cap 26 and a fixed part 33 on the solenoid unit. The coil 28 assumes the major share of the load of projecting the armature and is adapted to be deenergized when the armature is projected, by the opening of a switch 34, one contact of which is engaged by the flange 36 on the cap 26 when the armature nears the inward limit of projection. The other coil 30 is a holding coil which remains energized as long as the main control circuit is closed for holding the armature in its projected position, and thus biasing the bolt 4 toward engagement with the notched ring 8, and causing such engagement to take place as soon as a reversal of driving torque on the sun gear causes the balk ring 10 to be oscillated to unblocked position.

The main control circuit just referred to includes a governor operated switch 38, an accelerator operated switch 40 and a cable switch 42 connected in series with the operating coil 44 of a duplex relay 46 having a set of contacts A which control the making and breaking of the circuit to the solenoid coils 28 and 30. From the vehicle battery 48 current is taken through a conductor 50 to the coil 44. The coil 44 and switches 38, 40 and 42 are connected in series by conductors 52, 54 and 56 respectively, the switch 42 being grounded as at 58 to complete the circuit.

The governor switch 38 is adapted to remain open at speeds below the overdrive range and to close at the overdrive cut-in speed. The accelerator switch 40 is normally closed under spring pressure and is adapted to be opened by depression of the accelerator pedal 59 beyond full throttle position. The cable switch 42 is manually controlled and is adapted to be closed so as to set the transmission for overdrive operation, or to be opened so as to prevent overdrive operation.

The solenoid circuit includes the coils 28 and 30, the battery 48 and the conductor 50, a conductor 50a leading from the conductor 50 to the contacts A, conductors 60 and 60a connecting the coils 28 and 30 in parallel to the contacts A, and grounding connections 62 and 62a respectively. The coil 28 is connected to the ground connection 62 through the switch 34.

It may be noted at this point that with the cable switch 42 and the accelerator switch 40 closed, as soon as the speed of the vehicle reaches the overdrive range, the governor switch 38 will close, thereby completing the main control circuit through the operating coil 44 of the relay 46 and causing the contacts A which have previously been standing open, to close and to thereby complete the solenoid circuit, energizing the coils 28 and 30 and causing the armature 16 to bias the bolt 4 toward braking position. By closing the throttle temporarily, the operator may cause the engine to decelerate, thus reversing the driving torque on the sun gear and oscillating the balk ring 10 to an inoperative position permitting the bolt 4 to advance into a recess 6 in the ring 8, thus braking the sun gear against rotation and establishing overdrive ratio. Vice versa, when the speed of the governor drops below the overdrive range, opening the switch 38 or when the accelerator operated switch 40 is opened, the coil 44 will be deenergized and the contact A will return to open position under the pull of its return spring (not shown), thus opening the solenoid circuit, deenergizing the coils 28 and 30, and allowing the armature and bolt assembly to be retracted by the spring 32, as soon as the torque load on the sun gear is removed so as to permit the bolt to free itself from the engagement of the ring 8.

In Fig. 1 is shown schematically a duplex ignition system including double ignition coils 66 and distributors 68 respectively, supplied in parallel by current from the battery 48 through a conductor line 65.

In order to effect a reversal of the torque load on the sun gear during normal operation there is provided the ignition interrupting circuit by means of which the primaries of the ignition coils 66 at the distributor 68 are momentarily connected together, thus grounding the ignition and preventing the engine from firing. The grounding circuit includes conductors 70 and 72 connected to the respective condensers and adapted to be connected in series by a switch B, a conductor 74, a switch C and a switch D. The switch B comprises the second set of contacts of the duplex relay 46 and is adapted to be opened when the contacts A are closed and vice versa. The switches C and 38 each include movable contacts each forming part of a common movable unit 41 adapted to be moved in switch closing direction by a governor 39 as the speed of the governor increases, and to be moved in switch opening direction by a spring 43 as the speed of the governor decreases. The switch D is mounted in the housing of the solenoid 14, one contact thereof being adapted to be engaged by the reduced end 76 of the rod 20 when the bolt is retracted, and to be thereby moved away from the other contact as to open the switch.

In the normal operation of the transmission, opening of the main control circuit through the switch 40 will deenergize the coil 44, causing the switch A to open, thus deenergizing the solenoid and simultaneously causing the contacts B to close, completing the grounding circuit and interrupting the ignition. The resulting braking effect of compression in the engine will cause a reversal of driving torque on the sun gear sufficient to release the grip of the ring 8 against the bolt 4 and allow the bolt and armature to be withdrawn by the spring 32. The retraction of the bolt causes the reduced end portion 76 of the rod 20 to open the switch C, thus restoring the ignition and permitting the engine to continue operation.

Under ordinary conditions, the length of time elapsing between the beginning of accelerator pedal depression and the interruption of the ignition is immaterial. However, with a conventional winding and core in the coil 44, it would be possible under certain conditions for the ignition to be interrupted indefinitely. When the vehicle is coasting against the engine, a very rapid opening of the throttle may cause the ignition to be grounded without allowing the engine to accelerate rapidly enough to eliminate the coast load on the bolt. In overdrive transmissions now in use, this difficulty is avoided by the provision of an additional relay in series with the contacts B and D adapted to open after an interval of delay in the event that the grounding circuit is not previously broken by the switch D. By thus opening the grounding circuit, the engine is given an opportunity to accelerate under the opened throttle, thus providing the necessary reversal of driving torque for freeing the bolt. Under such conditions, the power will be interrupted during the full period of delayed action.

The present invention eliminates the necessity for this additional relay, by providing a delayed action in the duplex relay 46, sufficient to delay the establishing of the grounding circuit until a sufficient interval of time following opening the throttle to permit the engine to accelerate so as to remove the coast load. The removal of the coast load will permit the bolt 4 to be retracted and the grounding circuit will be rendered inoperative by the consequent opening of the switch D. Under such operation, there will be no interruption of the ignition.

Thus it will be apparent that the interval of grounding of the ignition will in no case exceed the length of time required for the retraction of the bolt to open the switch D, and the operation is uniform in all cases where a throttle controlled shift is made while the transmission is operating in the overdrive range.

Where the governor switch opens while bolt 4 is engaged under a coast load, as for example where the vehicle has been allowed to coast against the engine while decelerating from the overdrive range to the direct drive range, the grounding of the ignition circuit resulting from the closing of the switch B will maintain the coast load and therefore prevent instead of effecting the release of the bolt. The invention counteracts this condition by providing the switch C in series with the switches B and D, and arranging the switch C to be opened by the governor 39. The invention contemplates that the switch C may open simultaneously with the primary governor switch 38, in which case it prevents the grounding circuit from becoming operative except when the vehicle is operating in the overdrive range, or, as an alternative arrangement, the switch C may be arranged to open at a speed sufficiently lower than the speed at which the primary governor switch 38 opens, so that the switch C functions to re-establish the ignition circuit after it has been grounded by the closing of the switch B. An advantage of the latter arrangement will be presently explained.

By preventing the grounding circuit from becoming operative or by re-establishing the ignition after interruption, the switch C makes it possible for the engine to accelerate so as to remove the coast load on the bolt and permit the bolt to be retracted.

A different set of conditions arises where the vehicle decelerates from the overdrive range to the direct drive range while forward drive is being maintained through the planetary gear, as for example where the vehicle is being operated in overdrive on an up-grade and a partially opened throttle, so as to lose speed. Under such conditions the switch C will, if it opens simultaneously with the primary governor switch 38, prevent the establishing of the grounding circuit and thereby make it necessary for the operator to momentarily close the throttle so as the decelerate the engine and remove the forward drive load on the bolt. The alternative arrangement contemplated by the invention, wherein the switch C does not normally close until after the grounding switch D has closed, provides for the automatic interruption of the ignition so as to reverse the torque and free the bolt, and does not necessitate any manipulation of the throttle by the operator.

Figure 2:
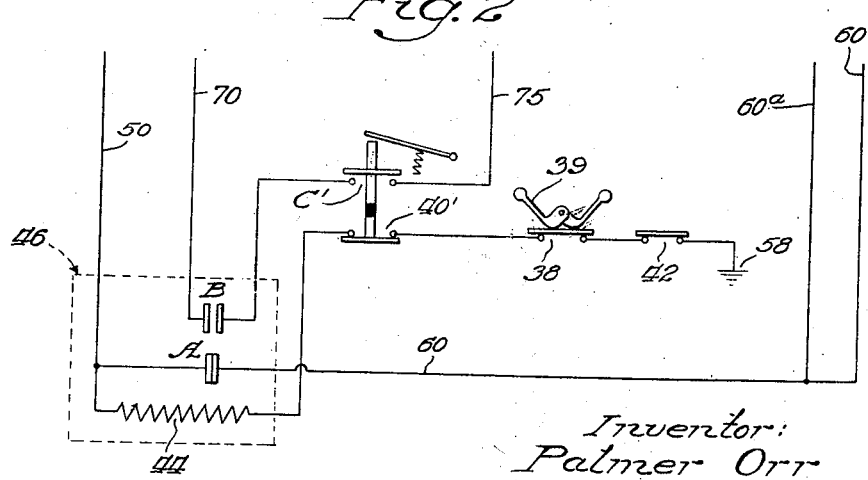
Fig. 2 is a schematic view of a portion of the control circuit incorporating a modification of the invention.

An alternative arrangement is shown in Fig. 2, wherein a switch C' is incorporated as a set of extra contacts in the accelerator operated switch 40', instead of being incorporated in the governor as in the form above described.

This arrangement is identical with that shown in Fig. 1, with the exception of the governor and throttle operated switches, and the same reference numerals have been employed to designate the similar parts which have been shown. In view of the fact that the solenoid and ignition arrangement is identical, these parts have been omitted from Fig. 2, and reference is made to Fig. 1 for the illustration thereof. In this arrangement, the switch C' is normally open, so that it is impossible for the ignition to become interrupted as a result of the opening of the governor switch 38. Thus, it is immaterial whether the bolt 4 is under a coast load at the time the governor switch opens.

In the accelerator controlled operation the switch 40' will be opened and the switch C' will be closed. The opening of the switch 40' will cause the switch A to open and the switch B to close, thus deenergizing the solenoid and completing the grounding circuit so that the spring 32 may withdraw the bolt 4.

In the event the bolt is engaged under a coast load at the time the accelerator switch is opened, the delayed action of the relay 46 will provide the necessary interval of engine acceleration to effect release of the coast load, before completion of the grounding circuit.

Where the governor switch 38 opens while forward drive is being maintained through the planetary gearing, as for example, while the vehicle is going up a steep grade under partially open throttle, the resultant closing of the switch B will not cause interruption of the engine for the reason that the switch C' will remain open. Shift back to direct drive can be effected under such circumstances by either opening the throttle to the wide open position so as to close the switch C', thereby interrupting the ignition or by closing the throttle so as to decelerate the engine.

In the form of the invention shown in Fig. 3, the ignition is rendered inoperative by opening the ignition circuit instead of by grounding it as in the previous forms. The solenoid control circuit, including the primary control switches 38, 40, 42, and the relay 44, and the solenoid circuit, including the switch A and the coils 28 and 30, are the same as in the form shown in Fig. 1, and the same reference numerals are applied to all parts of this circuit. In the ignition circuit, however, instead of the single conductor 65 extending from the battery 48 directly to the ignition coil 66, there is provided the circuit 65" including the switch B which is closed when the relay 44 is energized, and the circuit 65a including the solenoid control switch D" which is open when in overdrive and is adapted to be closed by the retraction of the bolt 4. In the normal operation of the transmission, the ignition coil will be energized through the circuit 65a when the transmission is operating below the overdrive range, and through the circuit 65" when the transmission is operating in the overdrive range. In the first instance, the primary governor switch 38 will be open, the relay 44 will be deenergized, both switches A and B will be open, the solenoid will be deenergized, the bolt 4 will be held in retracted position by its retracting spring 32, and the switch D" will be consequently closed. In the second instance, the primary governor switch 38 will be closed, the relay 44 will be energized, and the switches A and B will be closed as shown in Fig. 3.

When the primary governor switch 38 opens as the result of a reduction in speed, the relay 44 will be deenergized, the switches A and B will open, the solenoid will be deenergized, and the bolt 4 will be biased to retracted position. As the result of the opening of the switch B, both circuits 65" and 65a to the ignition coil will be open momentarily, causing the engine to misfire so as to produce a torque reversal permitting the bolt 4 to be withdrawn. The withdrawal of the bolt will result in the closing of the switch D", reestablishing the ignition through the circuit 65a.

Where the throttle is opened rapidly while the bolt 4 is engaged under a coast load, the delayed action of the relay 44 will maintain the switch B closed and the ignition circuit energized through the line 65" until the engine has accelerated sufficiently to remove the coast load. The removal of the coast load will permit the bolt 4 to be retracted, thus closing the switch D" and establishing the ignition circuit through the line 65a, so that the opening of the switch B will not interrupt the ignition.

Where the opening of the governor switch 38 takes place while the bolt 4 is engaged under a coast load, the ignition circuit is energized by the closing of the auxiliary governor switch C" which establishes a shunt circuit 65b across the switch B.

As in the form of the invention shown in Fig. 1, the switch C" may, if desired, be arranged to normally close at a speed sufficiently lower than the speed at which switch 38 opens, so as to permit the switch B to open and interrupt the ignition in the meantime, thereby providing for automatic shift down from overdrive to direct under conditions arising where the vehicle decelerates from the overdrive into the direct drive range while forward drive is being maintained.

Since these conditions are rather unusual, the employment of the delayed action of the switch C or C" is not considered to be wholly essential to an operative transmission embodying the invention.

It will now be apparent that the invention provides a simplified control arrangement in a multiple drive ratio transmission, whereby the drive may upon the closing of a governor controlled switch be automatically shifted to a higher ratio carried through the planetary gearing; whereby the drive may, at the will of the operator by opening the throttle to wide open position, be shifted back to the lower ratio while such governor controlled switch remains closed; wherein the transition from the higher to the lower drive is effected by retracting a locking element which holds the sun gear of the planetary gearing stationary for establishing the drive through the planetary gearing; wherein release of forward drive torque load on said locking elements is effected by interrupting the ignition; wherein such interruption is controlled by a switch which is moved to interrupting position by the opening of a main control circuit which is jointly controlled by the governor switch and the accelerator; wherein the release of coast loads against the locking bolt, when the throttle is opened, is guaranteed by a delayed action in the ignition interrupting switch which prevents the ignition from being interrupted until the engine has had sufficient time to accelerate under the open throttle to remove the coast load; wherein in the lower drive range the ignition interrupting switch is rendered inoperative by a secondary governor control switch, so as to avoid interruption of the ignition when the vehicle drops from a speed within the higher drive range to a speed within the lower drive range while coasting; and wherein such secondary governor switch may have a delayed action with reference to the main governor switch so as to provide an interval in which the ignition interrupting switch may become operative for causing the transmission to automatically shift down from the higher to the lower ratio where the vehicle decelerates from a speed within the higher drive range to a speed within the lower drive range while forward drive is being maintained through the gearing.

While the particular transmission described herein has been referred to as an overdrive transmission, it is to be understood that the invention is applicable to any type of transmission wherein a shift from a drive through planetary gearing to a lower drive bypassing the planetary gearing, and vice-versa, is effected by the mechanism described herein.

I claim:

1. In a multiple drive ratio transmission including a rotatable torque transmitting element adapted when rotating to permit the transmission to operate in one drive ratio and when braked to establish another drive ratio, for a motor vehicle including an engine; means for braking said element, means for shifting said braking means, a relay, a first switch controlled by said relay and adapted to control the movement of said shifting means, and a second switch controlled by said relay and adapted when said first switch is in brake release position to effect the interruption of the ignition of said engine, so as to produce a reversal of driving torque on said element permitting release of said braking means, said relay having an interval of delayed action preceding the ignition interruption, during which the engine may accelerate to remove any coast load that may be imposed upon said braking means.

2. In a multiple drive ratio transmission including a rotatable torque transmitting element adapted when rotating to permit the transmission to operate in one drive ratio and when braked to establish another drive ratio, for a motor vehicle including an engine; means for braking said element, electromagnetic means for shifting said braking means, a relay, a first switch controlled by said relay and adapted to control the energization of said electromagnetic means, and a second switch controlled by said relay and adapted when said first switch is in brake release position to effect the interruption of the ignition of said engine so as to produce a reversal of driving torque on said element permitting release of said braking means, said relay having an interval of delay action preceding ignition interruption during which the engine may accelerate to remove any coast load that may be imposed upon said braking means.

3. In a multiple drive ratio transmission including a rotatable torque-transmitting element adapted when rotating to permit the transmission to operate in one drive ratio and when braked to establish another drive ratio, for a motor vehicle including an engine and throttle control means therefor; means for braking said element, electromagnetic means for shifting said braking means, a relay, primary control means for controlling the energization of said relay, a first switch controlled by said relay and adapted when the relay is energized to effect the energization of said electromagnetic means, and a second switch controlled by said relay and adapted when the relay is deenergized to effect the interruption of the ignition of said engine so as to produce a reversal of driving torque on said element permitting release of said braking means, said relay having a delayed action establishing an interval between deenergization of the relay and interruption of the ignition, during which the engine may accelerate to remove any coast load that may be imposed upon the braking means.

4. In a multiple drive ratio transmission including a rotatable torque transmitting element adapted when rotating to permit the transmission to operate in one drive ratio and when braked to establish another drive ratio, for a motor vehicle including an engine; means for braking said element, electromagnetic means adapted when energized to urge said braking means toward braking position, spring means urging said braking means toward release position, a relay, primary control means for controlling the energization of said relay, a first switch controlled by said relay and adapted when the relay is energized to effect the energization of said electromagnetic means, and a second switch controlled by said relay and adapted when the relay is deenergized to effect the interruption of the ignition of said engine so as to produce a reversal of driving torque on said element permitting release of said braking means, said relay having a delayed action establishing an interval between deenergization of the relay and interruption of the ignition, during which the engine may accelerate to remove any coast load that may be imposed upon said braking means.

5. A transmission as defined in claim 3, wherein said primary control means includes a governor operated switch and a switch, operated by said throttle control means and in series with said governor operated switch, said switches being adapted when both are closed, to effect energization of the relay.

6. In a multiple drive ratio transmission including a rotatable torque transmitting element adapted when rotating to permit the transmission to operate in one drive ratio and when braked to establish another drive ratio, for a motor vehicle including an engine; means for braking said element, electromagnetic means for shifting said braking means, a relay, primary control means for controlling the energization of said relay, a first switch controlled by said relay, for controlling the energization of said electromagnetic means, means for temporarily removing the torque load from the braking means so as to permit release thereof, said last means including a second switch controlled by said relay and adapted when said first switch moves to brake release position to effect interruption of the ignition of said engine and thereby produce a reversal of driving torque on said element, and a governor having a first switch forming part of said primary control means and a second switch forming part of said torque load removing means.

7. In a multiple drive ratio transmission including a rotatable torque-transmitting element adapted when rotating to permit the transmission to operate in one drive ratio and when braked to establish another drive ratio, for a motor vehicle including an engine and throttle control means therefor; braking means for holding said element against rotation, electromagnetic means for shifting said braking means, a relay, primary control means for controlling the energization of said relay, a first switch controlled by said relay, for controlling the energization of said electromagnetic means, means for temporarily removing the torque load from the braking means so as to facilitate release thereof, said last means including a second switch controlled by said relay and adapted when said first switch moves to brake release position to effect interruption of the ignition, and a pair of switches, operated by said throttle control means, one forming part of said primary control means and the other forming part of said torque load removing means.

8. A transmission as defined in claim 3, including a governor having a first switch forming part of said primary control means and a second switch forming part of said torque load removing means.

9. A transmission as defined in claim 3, including a pair of switches, operated by said throttle control means, one forming part of said primary control means and the other forming part of said torque load removing means.

10. In a multiple drive ratio transmission including a rotatable torque transmitting element adapted when rotating to permit the transmission to operate in one drive ratio and when braked to establish another drive ratio, for a motor vehicle including an engine; means for braking said element, electromagnetic means adapted when energized to urge said braking means toward braking position, a relay, primary control means for controlling the energization of said relay, a first relay controlled switch adapted to close when said relay is energized and to thereby effect the energization of said electromagnetic means, a second relay controlled switch adapted when the relay is deenergized to close and to thereby establish a circuit for grounding the ignition of said engine so as to produce a reversal of driving torque on said rotatable element permitting release of said braking means, said relay having a delayed action providing an interval between the opening of the relay energizing circuit by said primary control means and the grounding of the ignition, during which said engine may accelerate to remove any coast load that may be imposed on said braking means.

11. A transmission as defined in the preceding claim, wherein said primary control means includes a governor operated switch and a switch, operated by said throttle control means, said switches being in series and adapted when both are closed, to effect energization of said relay.

12. In a multiple drive ratio transmission including a rotatable torque-transmitting element adapted when rotating to permit the transmission to operate in one drive ratio and when braked to establish another drive ratio, for a motor vehicle including an engine; means for braking said element, electromagnetic means adapted when energized to urge said braking means toward braking position, a relay, primary control means for energizing said relay, a first switch controlled by said relay and adapted when said relay is energized to close and thereby establish a circuit for energizing said electromagnetic means, a second switch controlled by said relay, forming part of the ignition circuit, and adapted when the relay is deenergized to open and thereby deenergize the ignition circuit so as to produce a reversal of driving torque on said element permitting release of said braking means, said relay having a delayed action establishing an interval between the opening of the relay energizing circuit by said primary control means and the deenergization of said ignition circuit during which the engine may accelerate so as to remove any coast load that may be imposed upon said braking means.

13. In a multiple drive ratio transmission including a rotatable torque transmitting element adapted when rotating to permit the transmission to operate in one drive ratio and when braked to establish another drive ratio, for a motor vehicle including an engine and throttle control means therefor; means for braking said element, electromagnetic means for shifting said braking means, a relay, a first switch controlled by said relay, for controlling the energization of said electromagnetic means, primary control means including a pair of switches in series in a circuit for energizing said relay, a governor for automatically controlling one of said switches in response to vehicle speed, the other of said switches being normally closed and adapted to be opened by movement of the throttle control means, a second switch controlled by said relay and adapted when said first switch moves to brake release position to effect the interruption of said engine so as to produce a reversal of driving torque on said rotatable element permitting the release of said braking means, said relay having a delayed action establishing an interval between the opening of the throttle and the operation of said switch, during which the engine may accelerate to remove any coast load that may be imposed upon said braking means, and a second governor operated switch adapted when the governor is below its critical speed to counteract the effect of said second relay operated switch under certain operating conditions.

14. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is relieved, electromagnetic means adapted when energized to urge one of said elements toward engagement with the other, yielding means to urge said one element toward disengaged position, a relay, primary control means for controlling the energization of said relay, a first relay controlled switch adapted to close when said relay is energized and to thereby effect the energization of said electromagnetic means, a second relay controlled switch adapted when the relay is deenergized to close and to thereby establish a circuit for grounding the ignition of said engine so as to produce a reversal of torque permitting disengagement of said elements, said relay having a delayed action providing an interval between the opening of the relay energizing circuit by said primary control means and the grounding of the ignition, during which said engine may accelerate to remove any coast load that may be imposed on said braking means.

15. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is relieved, electromagnetic means for shifting one of said elements, a relay, primary control means for controlling the deenergization of said relay, a first switch controlled by said relay, for controlling the energization of said electromagnetic means, means for temporarily removing the torque load from said drive control elements so as to facilitate disengagement thereof, said last means including a second switch controlled by said relay and adapted when said first switch moves to its position for effecting disengagement of said elements, to effect interruption of the ignition of said engine so as to remove forward drive torque load on said elements, said relay having a delayed action providing an interval between actuation of the relay circuit by said primary control means and the interruption of the ignition, during which coast load on said elements may be released.

16. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is relieved, means for shifting one of said drive control elements, a relay, a first switch controlled by said relay and adapted to control the movement of said shifting means, and a second switch controlled by said relay and adapted when said first switch is in its position for effecting release of said elements, to effect the interruption of the ignition of said engine so as to remove forward drive torque load on said elements, said relay having an interval of delayed action preceding the ignition interruption, during which coast load on said elements may be released.

17. In a multiple drive ratio transmission for a motor vehicle including an engine and throttle control means therefor; positively interengageable drive control elements adapted when disengaged to permit the transmission to operate in one drive ratio and when engaged to establish another drive ratio, said elements being subject to torque load when engaged and being freely disengageable only when said load is relieved, electromagnetic means for shifting one of said elements, a relay, primary control means for controlling the de-energization of said relay, a first switch controlled by said relay, for controlling the energization of said electromagnetic means, means for temporarily removing the torque load from said drive control elements so as to facilitate disengagement thereof, said last means including a second switch controlled by said relay and adapted when said first switch moves to its position for effecting disengagement of said elements, to effect interruption of the ignition of said engine so as to remove forward drive torque load on said elements, said relay having a delayed action providing an interval between actuation of the relay circuit by said primary control means and the interruption of the ignition, during which coast load on said elements may be released, said primary control means including a governor operated switch and a switch operated by said throttle control means, said switches being in series and adapted when both are closed, to effect energization of said relay.

18. In a multiple drive ratio transmission for a motor vehicle including an engine and throttle control means therefor; positively interengageable drive control elements adapted when disengaged to permit the transmission to operate in one drive ratio and when engaged to establish another drive ratio, said elements being subject to torque load when engaged and being freely disengageable only when said load is relieved, electromagnetic means for shifting one of said elements, a relay, primary control means for controlling the de-energization of said relay, a first switch controlled by said relay, for controlling the energization of said electromagnetic means, means for temporarily removing the torque load from said drive control elements so as to facilitate disengagement thereof, said last means including a second switch controlled by said relay and adapted when said first switch moves to its position for effecting disengagement of said elements, to effect interruption of the ignition of said engine so as to remove forward drive torque load on said elements, said relay having a delayed action providing an interval between actuation of the relay circuit by said primary control means and the interruption of the ignition, during which coast load on said elements may be released, a governor having a first switch forming part of said primary control means and a second switch forming part of said torque load removing means.

19. In a multiple drive ratio transmission for a motor vehicle including an engine and throttle control means therefor; positively interengageable drive control elements adapted when disengaged to permit the transmission to operate in one drive ratio and when engaged to establish another drive ratio, said elements being subject to torque load when engaged and being freely disengageable only when said load is relieved, electromagnetic means for shifting one of said elements, a relay, primary control means for controlling the de-energization of said relay, a first switch controlled by said relay, for controlling the energization of said electromagnetic means, means for temporarily removing the torque load from said drive control elements so as to facilitate disengagement thereof, said last means including a second switch controlled by said relay and adapted when said first switch moves to its position for effecting disengagement of said elements, to effect interruption of the ignition of said engine so as to remove forward drive torque load on said elements, said relay having a delayed action providing an interval between actuation of the relay circuit by said primary control means and the interruption of the ignition, during which coast load on said elements may be released, a pair of switches operated by said throttle control means, one of said switches forming part of said primary control means and the other forming part of said torque load removing means.

20. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is released, means for shifting one of said drive control elements, a switch for controlling the movement of said shifting means, and a relay controlled switch adapted when said first switch is in its position for effecting release of said elements, to effect the interruption of the ignition of said engine so as to remove forward drive torque load on said elements, said relay having an interval of delayed action preceding the ignition interruption, during which coast load on said elements may be released.

21. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is released, means for shifting one of said drive control elements, a control device for controlling the movement of said shifting means, and a relay controlled switch adapted when said control device is in its position for effecting release of said elements, to effect the interruption of the ignition of said engine so as to remove forward drive torque load on said elements, said relay controlled switch having an interval of delayed action preceding the ignition interruption during which coast load on said elements may be released.

22. In a multiple drive ratio transmission for a motor vehicle including an engine; positively interengageable drive control elements adapted when disengaged to permit the transmission to operate in one drive ratio and when engaged to establish another drive ratio, said elements being subject to troque load when engaged and being freely disengageable only when said load is relieved, electro-magnetic means adapted when energized to urge one of said elements toward engagement with the other, yielding means to urge said one element toward disengaged position, primary control means for controlling the operation of said electro-magnetic means, a relay controlled switch adapted when said primary control means is set for the deenergization of said electro-magnetic means to close and to thereby establish a circuit for grounding the ignition of said engine so as to produce a reversal of torque permitting disengagement of said elements, said relay controlled switch having a delayed action providing an interval between the setting of said primary control means for deenergization of said electro-magnetic means and the grounding of the ignition, during which said engine may accelerate to remove any coast load that may be imposed on said braking means.

23. In a multiple drive ratio transmission for a motor vehicle including an engine; positively interengageable drive control elements adapted when disengaged to permit the transmission to operate in one drive ratio and when engaged to establish another drive ratio, said elements being subject to torque load when engaged and being freely disengageable only when said load is relieved, electro-magnetic means for moving one of said elements in one direction, yielding means to urge said one element in the opposite direction, primary control means for controlling the operation of said electro-magnetic means, and means for removing torque load on said elements, comprising a relay controlled switch adapted when said primary control means is set for effecting the disengagement of said elements to effect the interruption of the ignition of said engine so as to remove forward drive torque load on said elements, said relay controlled switch having an interval of delayed action preceding the ignition interruption during which coast load on said elements may be released.

24. A transmission as defined in claim 23, including a governor having a first switch forming part of said primary control means and a second switch forming part of said torque load removing means.

25. A transmission as defined in claim 23, including a pair of switches operated by said throttle control means, one forming part of said primary control means and the other forming part of said torque load removing means.

PALMER ORR.